United States Patent
Dudovitch et al.

(10) Patent No.: US 12,170,747 B2
(45) Date of Patent: *Dec. 17, 2024

(54) AUGMENTED REALITY UNBOXING EXPERIENCE

(71) Applicant: Snap Inc., Santa Monica, CA (US)

(72) Inventors: Gal Dudovitch, Tel Aviv (IL); Stephanie Engle, San Francisco, CA (US); Christie Marie Heikkinen, Sherman Oaks, CA (US); Ma'ayan Mishin Shuvi, Givatayim (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,721

(22) Filed: Jul. 19, 2023

(65) Prior Publication Data

US 2023/0370557 A1    Nov. 16, 2023

Related U.S. Application Data

(63) Continuation of application No. 17/544,273, filed on Dec. 7, 2021, now Pat. No. 11,748,958.

(51) Int. Cl.
*G06T 19/00* (2011.01)
*G06F 3/00* (2006.01)
(Continued)

(52) U.S. Cl.
CPC ....... *H04N 1/00766* (2013.01); *G06F 16/164* (2019.01); *H04N 1/00214* (2013.01);
(Continued)

(58) Field of Classification Search
CPC ....... G06T 19/006; H04N 23/61; G06F 3/017; G06F 3/04815; G06F 3/0484; G06F 3/04842; G06F 3/04845; G06F 3/167
See application file for complete search history.

(56) References Cited

U.S. PATENT DOCUMENTS

| 3,741,619 A | 6/1973 | Dyer et al. |
| 5,330,186 A | 7/1994 | Jones |

(Continued)

FOREIGN PATENT DOCUMENTS

| CN | 103049761 B | 8/2016 |
| CN | 106937531 A | 7/2017 |

(Continued)

OTHER PUBLICATIONS

"U.S. Appl. No. 17/544,273, Advisory Action mailed Mar. 24, 2023", 3 pgs.

(Continued)

*Primary Examiner* — Chante E Harrison

(74) *Attorney, Agent, or Firm* — Schwegman Lundberg & Woessner, P.A.

(57) ABSTRACT

Methods and systems are disclosed for performing operations for providing an augmented reality unboxing experience. The operations include retrieving an augmented reality element comprising a virtual box that is in a closed state. The operations include obtaining triggers associated with the virtual box, the triggers configured to change the virtual box from the closed state to an open state. The operations include displaying the virtual box. The operations include receiving input associated with the virtual box. The operations include determining that the received input corresponds to the one or more triggers associated with the virtual box. The operations include modifying the virtual box from being displayed in the closed state to being displayed in the open state.

20 Claims, 11 Drawing Sheets

(51) Int. Cl.
*G06F 16/16* (2019.01)
*H04N 1/00* (2006.01)

(52) U.S. Cl.
CPC ..... *H04N 1/00331* (2013.01); *H04N 1/00782* (2013.01); *H04N 2201/3229* (2013.01)

(56) References Cited

U.S. PATENT DOCUMENTS

| | | | |
|---|---|---|---|
| 5,880,731 | A | 3/1999 | Liles et al. |
| 6,023,270 | A | 2/2000 | Brush, II et al. |
| 6,223,165 | B1 | 4/2001 | Lauffer |
| 6,772,195 | B1 | 8/2004 | Hatlelid et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 7,971,156 | B2 | 6/2011 | Albertson et al. |
| 7,996,793 | B2 | 8/2011 | Latta et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,146,005 | B2 | 3/2012 | Jones et al. |
| 8,151,191 | B2 | 4/2012 | Nicol |
| 8,384,719 | B2 | 2/2013 | Reville et al. |
| RE44,054 | E | 3/2013 | Kim |
| 8,396,708 | B2 | 3/2013 | Park et al. |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,487,938 | B2 | 7/2013 | Latta et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | Andres del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,856,691 | B2 | 10/2014 | Geisner et al. |
| 8,890,926 | B2 | 11/2014 | Tandon et al. |
| 8,892,999 | B2 | 11/2014 | Nims et al. |
| 8,924,250 | B2 | 12/2014 | Bates et al. |
| 8,963,926 | B2 | 2/2015 | Brown et al. |
| 8,989,786 | B2 | 3/2015 | Feghali |
| 9,086,776 | B2 | 7/2015 | Ye et al. |
| 9,105,014 | B2 | 8/2015 | Collet et al. |
| 9,225,897 | B1 | 12/2015 | Sehn et al. |
| 9,230,160 | B1 | 1/2016 | Kanter |
| 9,241,184 | B2 | 1/2016 | Weerasinghe |
| 9,256,860 | B2 | 2/2016 | Herger et al. |
| 9,276,886 | B1 | 3/2016 | Samaranayake |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,460,541 | B2 | 10/2016 | Li et al. |
| 9,489,760 | B2 | 11/2016 | Li et al. |
| 9,503,845 | B2 | 11/2016 | Vincent |
| 9,508,197 | B2 | 11/2016 | Quinn et al. |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,648,376 | B2 | 5/2017 | Chang et al. |
| 9,697,635 | B2 | 7/2017 | Quinn et al. |
| 9,705,831 | B2 | 7/2017 | Spiegel |
| 9,706,040 | B2 | 7/2017 | Kadirvel et al. |
| 9,742,713 | B2 | 8/2017 | Spiegel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,916,002 | B2 | 3/2018 | Petrovskaya et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,102,423 | B2 | 10/2018 | Shaburov et al. |
| 10,116,598 | B2 | 10/2018 | Tucker et al. |
| 10,155,168 | B2 | 12/2018 | Blackstock et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,284,508 | B1 | 5/2019 | Allen et al. |
| 10,362,219 | B2 | 7/2019 | Wilson et al. |
| 10,439,972 | B1 | 10/2019 | Spiegel et al. |
| 10,475,225 | B2 | 11/2019 | Park et al. |
| 10,504,266 | B2 | 12/2019 | Blattner et al. |
| 10,509,466 | B1 | 12/2019 | Miller et al. |
| 10,514,876 | B2 | 12/2019 | Sehn |
| 10,573,048 | B2 | 2/2020 | Ni et al. |
| 10,579,869 | B1 | 3/2020 | Xiong et al. |
| 10,614,855 | B2 | 4/2020 | Huang |
| 10,657,701 | B2 | 5/2020 | Osman et al. |
| 10,748,347 | B1 | 8/2020 | Li et al. |
| 10,762,716 | B1 | 9/2020 | Paul et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 11,748,958 | B2 | 9/2023 | Dudovitch et al. |
| 11,960,784 | B2 | 4/2024 | Dudovitch et al. |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |
| 2005/0206610 | A1 | 9/2005 | Cordelli |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |

(56) References Cited

U.S. PATENT DOCUMENTS

| | | |
|---|---|---|
| 2008/0158222 A1 | 7/2008 | Li et al. |
| 2008/0218472 A1 | 9/2008 | Breen et al. |
| 2009/0012788 A1 | 1/2009 | Gilbert et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0168755 A1 | 7/2009 | Peng et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0301934 A1 | 12/2011 | Tardif |
| 2012/0077580 A1 | 3/2012 | Mahajan et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0178281 A1 | 7/2013 | Ayyar et al. |
| 2013/0201187 A1 | 8/2013 | Tong et al. |
| 2013/0215116 A1 | 8/2013 | Siddique et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0171036 A1 | 6/2014 | Simmons |
| 2015/0120293 A1 | 4/2015 | Wohlert et al. |
| 2015/0206349 A1 | 7/2015 | Rosenthal et al. |
| 2015/0370320 A1 | 12/2015 | Connor |
| 2016/0134840 A1 | 5/2016 | Mcculloch |
| 2016/0196765 A1 | 7/2016 | Stauch et al. |
| 2016/0234149 A1 | 8/2016 | Tsuda et al. |
| 2016/0269508 A1 | 9/2016 | Sharma et al. |
| 2016/0285803 A1 | 9/2016 | Strohl et al. |
| 2017/0021273 A1* | 1/2017 | Rios .................. G06F 3/04842 |
| 2017/0080346 A1 | 3/2017 | Abbas |
| 2017/0087453 A1 | 3/2017 | Poisner et al. |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0123487 A1 | 5/2017 | Hazra et al. |
| 2017/0199855 A1 | 7/2017 | Fishbeck |
| 2017/0235848 A1 | 8/2017 | Van Dusen et al. |
| 2017/0277684 A1 | 9/2017 | Dharmarajan Mary |
| 2017/0277685 A1 | 9/2017 | Takumi |
| 2017/0310934 A1 | 10/2017 | Du et al. |
| 2017/0312634 A1 | 11/2017 | Ledoux et al. |
| 2017/0351910 A1 | 12/2017 | Elwazer et al. |
| 2018/0047200 A1 | 2/2018 | O'hara et al. |
| 2018/0113587 A1 | 4/2018 | Allen et al. |
| 2018/0114372 A1 | 4/2018 | Nagy et al. |
| 2018/0115503 A1 | 4/2018 | Baldwin et al. |
| 2018/0158370 A1 | 6/2018 | Pryor |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0275434 A1 | 9/2019 | Chandrasekaran et al. |
| 2019/0282891 A1 | 9/2019 | Buil et al. |
| 2020/0005284 A1 | 1/2020 | Vijayan |
| 2020/0105040 A1 | 4/2020 | Chamdani et al. |
| 2021/0011612 A1 | 1/2021 | Dancie et al. |
| 2021/0074016 A1 | 3/2021 | Li et al. |
| 2021/0074068 A1 | 3/2021 | Spivack et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0286502 A1 | 9/2021 | Lemay et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0021939 A1 | 1/2022 | Mizuta et al. |
| 2022/0188539 A1 | 6/2022 | Chan et al. |
| 2022/0206588 A1 | 6/2022 | Canberk et al. |
| 2022/0261881 A1 | 8/2022 | Aslam et al. |
| 2022/0300730 A1 | 9/2022 | Eirinberg et al. |
| 2022/0300731 A1 | 9/2022 | Eirinberg et al. |
| 2022/0309882 A1 | 9/2022 | Froy, Jr. et al. |
| 2022/0326781 A1 | 10/2022 | Hwang et al. |
| 2022/0327646 A1 | 10/2022 | Suzuki |
| 2022/0334649 A1 | 10/2022 | Hwang et al. |
| 2023/0176805 A1* | 6/2023 | Dudovitch .......... G06F 3/04842 715/757 |
| 2023/0177775 A1 | 6/2023 | Dudovitch et al. |
| 2023/0316296 A1* | 10/2023 | Beauchamp ......... G06Q 30/016 705/304 |
| 2024/0264791 A1 | 8/2024 | Dudovitch et al. |

FOREIGN PATENT DOCUMENTS

| | | | |
|---|---|---|---|
| CN | 107222753 A | * 9/2017 | |
| CN | 109246452 A | * 1/2019 | ........... H04N 21/254 |
| CN | 109478097 A | 3/2019 | |
| CN | 109863532 A | 6/2019 | |
| CN | 110168478 A | 8/2019 | |
| CN | 110413182 A | 11/2019 | |
| CN | 110769302 A | 2/2020 | |
| CN | 111651047 A | 9/2020 | |
| CN | 112044065 A | 12/2020 | |
| CN | 113329234 A | 8/2021 | |
| CN | 115047976 A | 9/2022 | |
| CN | 118369637 | 7/2024 | |
| CN | 118401912 | 7/2024 | |
| EP | 2184092 A2 | 5/2010 | |
| EP | 3707693 | 9/2020 | |
| EP | 3707693 A1 | 9/2020 | |
| JP | 2001230801 A | 8/2001 | |
| JP | 5497931 B2 | 3/2014 | |
| KR | 101445263 B1 | 9/2014 | |
| KR | 20220158824 A | 12/2022 | |
| WO | WO-2003094072 A1 | 11/2003 | |
| WO | WO-2004095308 A1 | 11/2004 | |
| WO | WO-2006107182 A1 | 10/2006 | |
| WO | WO-2007134402 A1 | 11/2007 | |
| WO | WO-2012139276 A1 | 10/2012 | |
| WO | WO-2013027893 A1 | 2/2013 | |
| WO | WO-2013152454 A1 | 10/2013 | |
| WO | WO-2013166588 A1 | 11/2013 | |
| WO | WO-2014015365 A1 | 1/2014 | |
| WO | WO-2014031899 A1 | 2/2014 | |
| WO | WO-2014194439 A1 | 12/2014 | |
| WO | WO-2016090605 A1 | 6/2016 | |
| WO | WO-2016168591 A1 | 10/2016 | |
| WO | WO-2018081013 A1 | 5/2018 | |
| WO | WO-2018102562 A1 | 6/2018 | |
| WO | WO-2018129531 A1 | 7/2018 | |
| WO | 2019094618 | 5/2019 | |
| WO | WO-2019089613 A1 | 5/2019 | |
| WO | WO-2019094618 A1 | 5/2019 | |
| WO | WO-2021079615 A1 | 4/2021 | |
| WO | WO-2022005687 A1 | 1/2022 | |
| WO | WO-2022005693 A1 | 1/2022 | |
| WO | WO-2022060549 A2 | 3/2022 | |
| WO | WO-2022066578 A1 | 3/2022 | |

(56) References Cited

FOREIGN PATENT DOCUMENTS

| WO | WO-2022132381 A1 | 6/2022 |
|---|---|---|
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | 2023107369 | 6/2023 |
| WO | 2023107372 | 6/2023 |

OTHER PUBLICATIONS

"U.S. Appl. No. 17/544,273, Corrected Notice of Allowability mailed Apr. 27, 2023", 2 pgs.

"U.S. Appl. No. 17/544,273, Final Office Action mailed Feb. 13, 2023", 20 pgs.

"U.S. Appl. No. 17/544,273, Non Final Office Action mailed Oct. 21, 2022", 17 pgs.

"U.S. Appl. No. 17/544,273, Notice of Allowance mailed Apr. 19, 2023", 9 pgs.

"U.S. Appl. No. 17/544,273, Response filed Jan. 10, 2023 to Non Final Office Action mailed Oct. 21, 2022", 10 pgs.

"U.S. Appl. No. 17/544,273, Response filed Mar. 8, 2023 to Final Office Action mailed Feb. 13, 2023", 10 pgs.

"International Application Serial No. PCT/US2022/051813, International Search Report mailed Mar. 20, 2023", 4 pgs.

"International Application Serial No. PCT/US2022/051813, Written Opinion mailed Mar. 20, 2023", 10 pgs.

Duguleana, Mihai, "Augmented Reality meets Non-Fungible Tokens Insights Towards Preserving Property Rights", IEEE International Symposium on Mixed and Augmented Reality Adjunct (Ismar-Adjunct), (Oct. 4, 2021), 359-361.

Zhang, Yiran, et al., "Switch Techniques to Recover Spatial Consistency Between Virtual and Real World for Navigation with Teleportation", 16th European Conference—Computer Vision—ECCV 2020, Cornell University Library, 201 Olin Library Cornell University Ithaca, NY, (Oct. 7, 2019), 3-23.

"International Application Serial No. PCT/US2022/051808, International Search Report mailed Mar. 21, 2023", 5 pgs.

"International Application Serial No. PCT/US2022/051808, Written Opinion mailed Mar. 21, 2023", 9 pgs.

"U.S. Appl. No. 17/544,403, Non Final Office Action mailed Sep. 15, 2023", 27 pgs.

"U.S. Appl. No. 17/544,403, Response filed Nov. 13, 2023 to Non Final Office Action mailed Sep. 15, 2023", 15 pgs.

"U.S. Appl. No. 17/544,403, Notice of Allowance mailed Dec. 15, 2023", 14 pgs.

"U.S. Appl. No. 17/544,403, Corrected Notice of Allowability mailed Dec. 29, 2023", 2 pgs.

"International Application Serial No. PCT US2022 051813, International Preliminary Report on Patentability mailed Jun. 20, 2024", 12 pgs.

"International Application Serial No. PCT US2022 051808, International Preliminary Report on Patentability mailed Jun. 20, 2024", 11 pgs.

* cited by examiner

| BOX TYPE | TRIGGERS |
|---|---|
| BOX TYPE 1 | SEQUENCE: SHAKE, TEAR, SPEAK, TWIST |
| BOX TYPE 2 | SEQUENCE: SHAKE, TEAR, TWIST |
| PORTAL | SEQUENCE: SHAKE, TEAR, TWIST, WALK IN DIRECTION |
| ENVIRONMENTAL FACTOR 1 | NEW TRIGGER: ACTION 1 |
| ENVIRONMENTAL FACTOR 2 | NEW TRIGGER: ACTION 2 |

*FIG. 6*

AUGMENTED REALITY UNBOXING EXPERIENCE

PRIORITY CLAIM

This application is a continuation of U.S. patent application Ser. No. 17/544,273, filed on Dec. 7, 2021, which is hereby incorporated by reference in its entirety.

TECHNICAL FIELD

The present disclosure relates generally to providing augmented reality experiences using a software application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 6 is a diagrammatic representation of a database that associates different box types with trigger sequences, in accordance with some examples.

DETAILED DESCRIPTION

Figure 1:
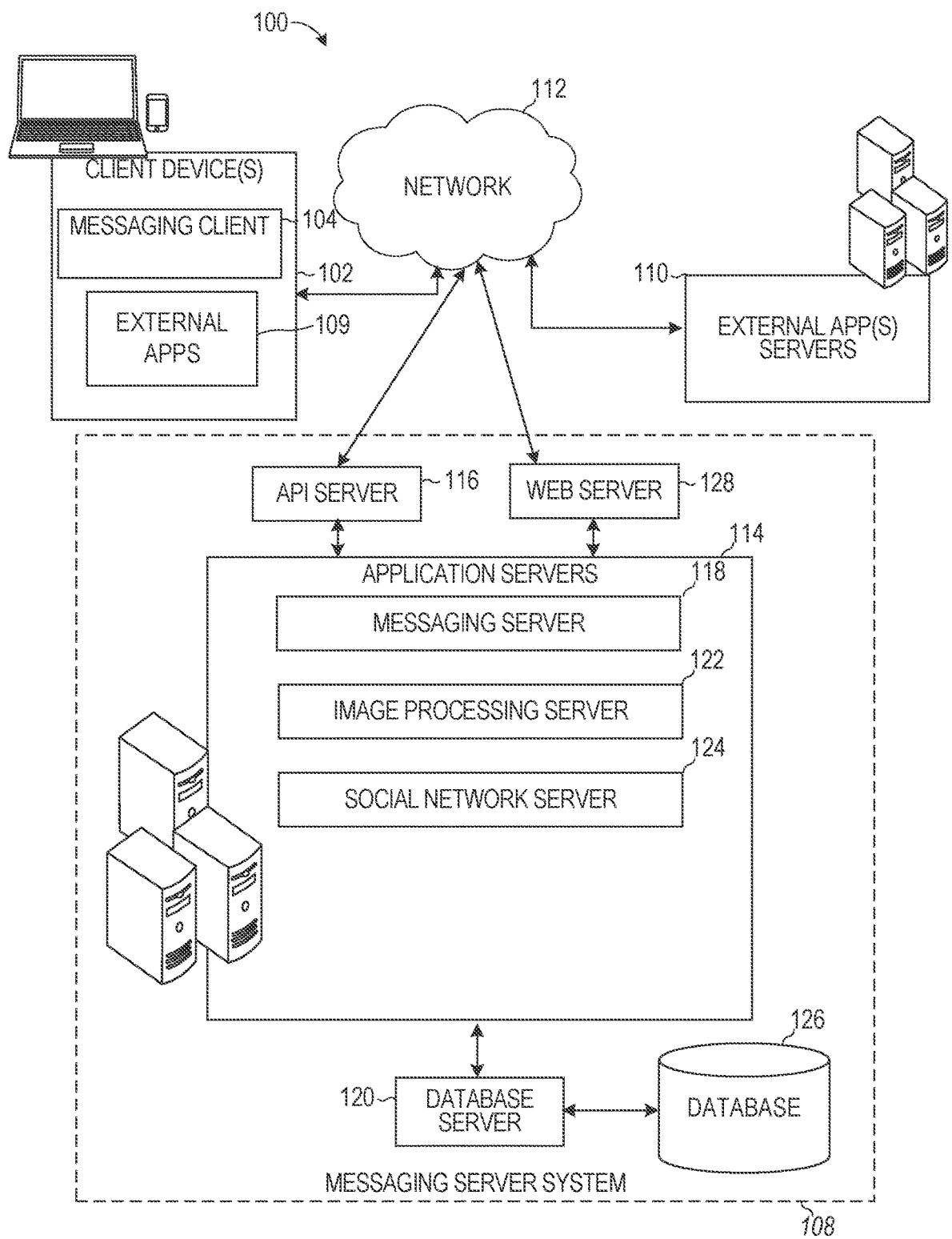
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Users often enjoy watching videos of other people opening packages and revealing their contents. Usually, these videos are prerecorded and shared over the Internet with a user's social network. The experience of unboxing is very common on social media and is a genre of content where people unbox a product to get a feel for the product. The experience is very exciting since it yields to anticipation users feel for something shiny and new. In many cases, users receive packages and forget to record the videos which result in missed opportunities for generating content that shows a user's reaction to opening a box.

Some systems create online experiences in which mystery boxes are delivered to users. In such systems, the virtual boxes are opened by simply tapping on the virtual boxes or selecting an open box option. Such experiences are not particularly interesting to share. Augmented reality (AR) and virtual reality (VR) systems provide opportunities for creating unique and engaging content which enhances user engagement with the applications.

The disclosed techniques improve the efficiency of using the electronic device by providing an AR or VR application that includes an unboxing experience. Particularly, the disclosed techniques provide a virtual experience that imitates, in some cases, the physical unboxing experience. In order to keep the experiences unique and engaging, different types of triggers are used to open the same or different sets of boxes. For example, after a user opens a particular box by performing a first sequence of physical and/or virtual actions, the box can be repackaged. In order to open the repackaged box, a second sequence of physical and/or virtual actions may need to be performed. This way, the same user or different users can continue engaging in an unboxing experience with the same box or a different box.

In an example, the disclosed techniques retrieve an augmented reality element comprising a virtual box that is in a closed state. The disclosed techniques obtain one or more triggers associated with the virtual box that are configured to change the virtual box from the closed state to an open state. The disclosed techniques display the augmented reality element comprising the virtual box as an overlay on top of a real-world environment depicted in a video stream. The disclosed techniques receive input associated with the augmented reality virtual box, such as detecting that the client device is being shaken or moved in a particular way or that a particular set of hand gestures are being performed. The disclosed techniques determine that the received input corresponds to (e.g., matches a sequence defined by) the one or more triggers associated with the virtual box and, in response, modify the augmented reality element from being displayed in the closed state to being displayed in the open state.

In some cases, the disclosed techniques automatically begin capturing a video of a user performing a last set of sequences in the sequence of triggers to share with one or more other users. For example, the disclosed techniques determine that a first portion of the sequence of triggers has been performed. In response, the disclosed techniques automatically activate a front-facing camera to capture an image or video of the user opening the box by performing a second portion of the sequence of triggers. Concurrently with capturing the image or video, the disclosed techniques change the state of the virtual box from the closed state to the open state to reveal contents of the virtual box.

This improves the overall experience of the user in using the electronic device. Also, by automating the video recording of a user's reaction to opening a box, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
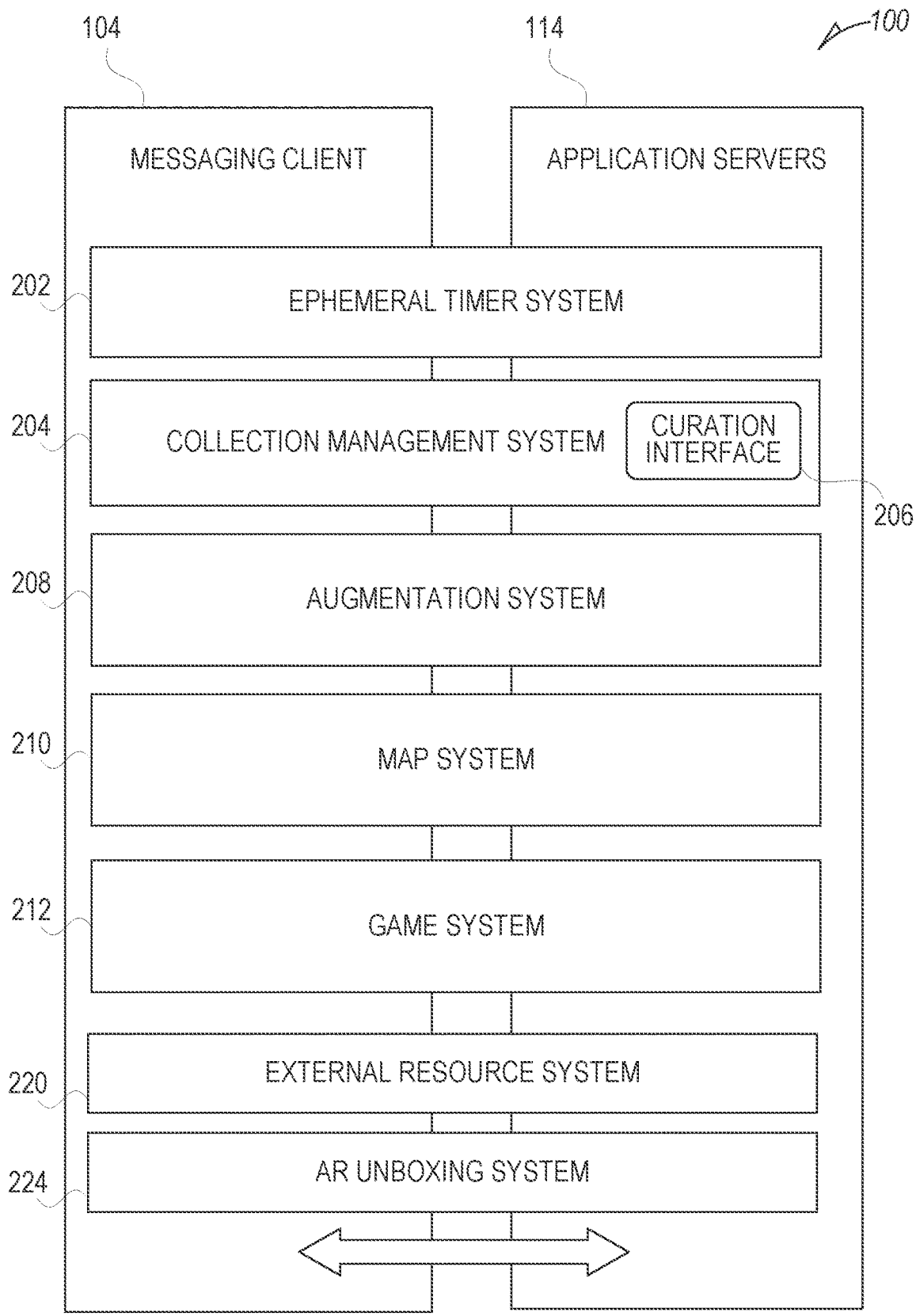
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., replacing a garment being worn by a user in a video or recoloring the garment worn by the user in the video or modifying the garment based on a gesture performed by the user).

Figure 3:
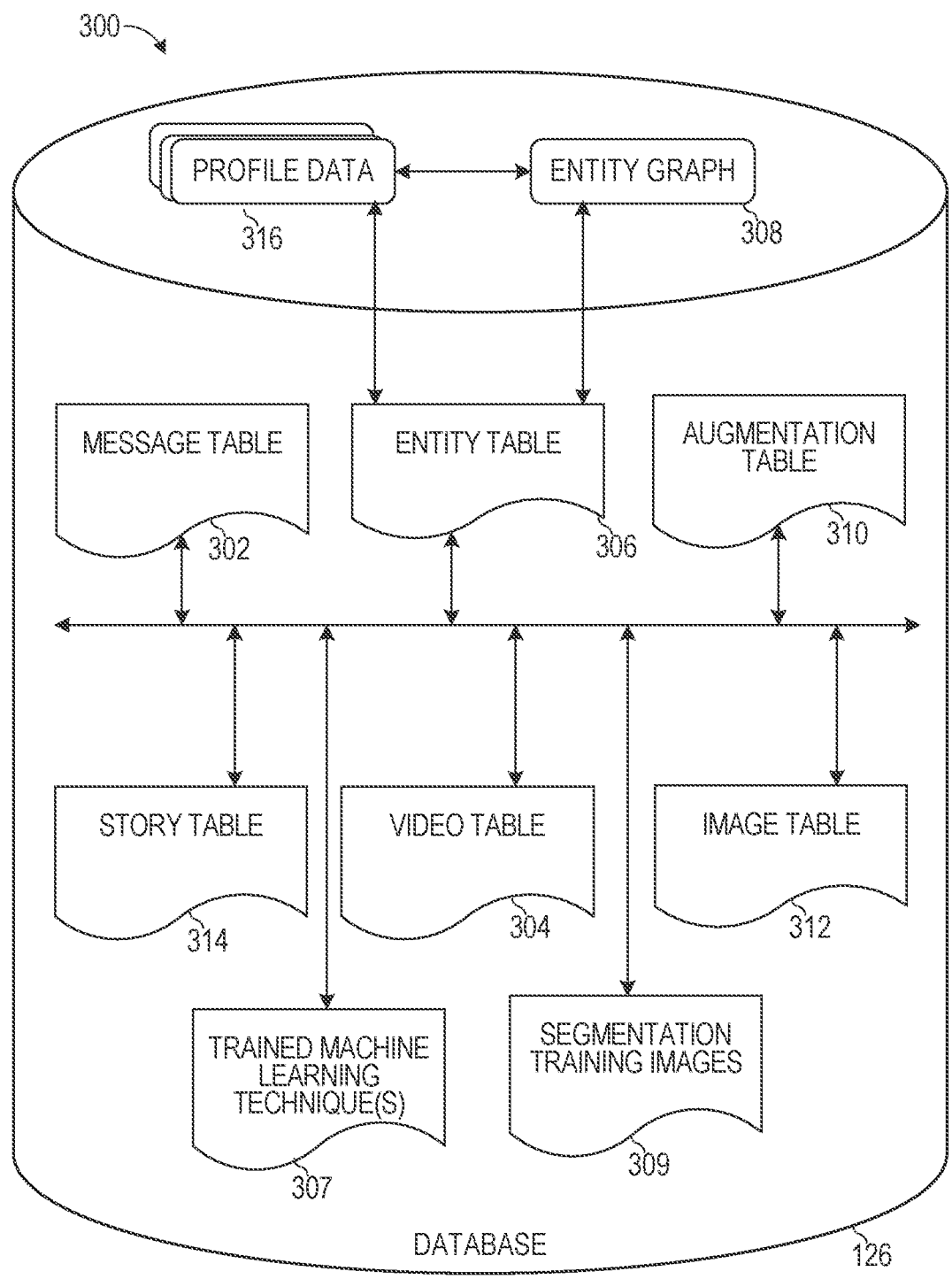
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present to a user one or more unboxing AR experiences. In an example, the messaging client 104 can present an unboxing AR experience in response to receiving input selecting an option to access a mystery box icon. The messaging client 104 presents a virtual box as a representation of the selected unboxing AR experience. The virtual box can be associated with a time limit during which certain sequences of actions can be performed in an attempt to open the virtual box. In some implementations, the virtual box can be associated with one or more sequences of triggers that control when the virtual box is opened (e.g., changed from being in a closed state to being in an open state). Once the virtual box is changed to being in an open state (e.g., when a sequence of user inputs or actions correspond to a sequence of triggers associated with the virtual box), a set of contents of the virtual box are enabled for access by the user. Different sequences of triggers are associated with different complexities or complexity levels or levels of difficulty of user actions. In one implementation, a first sequence of triggers associated with a first level of complexity of user actions includes a tapping a particular area of the virtual box followed by inserting a virtual key into another area of the virtual box. In another implementation, second sequence of triggers associated with a second level of complexity of user actions (greater or more difficult than the first level of complexity) includes a tapping a particular area of the virtual box followed by shaking the client device on which the virtual box is displayed or performing another suitable gesture. A higher level of complexity of user actions can correspond to a greater number of quantity of actions that need to be performed and/or different types of user actions that are more difficult to perform (e.g., tapping is less difficult than shaking) and/or more difficult challenge questions.

The set of contents of the virtual box can vary based on a type of the virtual box, a time of day, an experience level of the user, an activeness metric of the user, a cost of the virtual box, current weather conditions, location, number of friends, and so forth. The set of contents can include a set of related physical or virtual items or a set of unrelated physical or virtual items. In one example, the set of contents includes a set of avatar outfits that are enabled for use by the account or profile of the user. Specifically, after the virtual box is opened, the avatar outfits contained in the virtual box are added to an account of the user. The messaging client 104 then allows the user to customize a look of the user's avatar using the avatar outfits contained in the virtual box.

In another example, the set of contents include a set of virtual outfits that correspond to real-world articles of clothing. After the virtual box is opened, the messaging client 104 enables the user to select any one of the set of virtual outfits to launch a virtual try-on AR experience. In the virtual try-on AR experience, the messaging client 104 activates a front-facing camera and overlays the selected virtual outfit on depiction of the user in a video stream captured by the front-facing camera. If the user is satisfied and likes the selected virtual outfit, the messaging client 104 can receive input from a user that selects an option to purchase the real-world article of clothing corresponding to the virtual outfit. The cost to purchase the real-world article of clothing can be at a discount or lower than the cost to purchase the real-world article of clothing from a merchant prior to opening the virtual box. Namely, as a result of the user successfully opening the virtual box, the messaging client 104 can reduce the cost to purchase the real-world article of clothing.

In another example, the set of contents includes additional AR experiences or games. In response to opening the virtual box, the additional AR experiences or games are unlocked and made available for the user to consume and access. In another example, after the virtual box is opened, a virtual portal is displayed in AR on top of a video stream (e.g., captured by a rear-facing camera). The messaging client 104 can detect a location of the user and determine that the user is walking through the virtual portal. In response, the messaging client 104 navigates the user to a new dimension or screen or makes available a set of content for the user to consume. In some examples, the set of contents include audio or video media assets or content items. The audio or video media assets or content items are added to an account of the user to enable the user to consume or watch the audio or video media assets or content items in response to opening the virtual box. In another example, the set of contents include one or more non-fungible tokens (NFTs) associated with one or more virtual objects.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The AR unboxing system 224 obtains a virtual box (e.g., in response to receiving input selecting an AR unboxing experience icon) and presents the virtual box (in a closed state, such as with a lock in the locked position) as an overlay or within a real-world environment depicted in a video stream being captured by a front-facing or rear-facing camera. The AR unboxing system 224 determines a set or sequence of triggers associated with the virtual box which can vary based on certain factors or conditions such that different users are associated with different sequences of triggers for the same AR unboxing experience or virtual box. The AR unboxing system 224 then monitors actions performed by the user to determine when the actions match or correspond to the sequence of triggers. Once the AR unboxing system 224 determines that the actions match or correspond to the sequence of triggers, the AR unboxing system 224 changes the state of the virtual box to an open state (e.g., by changing the lock to the unlocked position) and makes the set of contents contained in the virtual box available for the user to consume or use. An illustrative implementation of the AR unboxing system 224 is shown and described in connection with FIG. 5 below.

Specifically, the AR unboxing system 224 is a component that can be accessed by an AR/VR application implemented on the client device 102. The AR/VR application uses an RGB camera to capture a monocular image or video of a real-world environment. The AR/VR application applies various trained machine learning techniques on the captured image or video to apply one or more AR visual effects (e.g., to display a virtual box in a closed or open state) to the captured image. In some implementations, the AR/VR application continuously captures images or a video of the real-world environment in real time or periodically to continuously or periodically update the applied one or more visual effects. This allows the user to move around in the real world and see the one or more visual effects update in real time.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters that have been trained during training of the AR unboxing system 224. For example, trained machine learning techniques 307 stores the trained parameters of one or more neural network machine learning techniques.

Segmentation training images 309 stores a plurality of images that each depict one or more users wearing different garments. The plurality of images stored in the segmentation training images 309 includes various depictions of one or more users wearing different garments together with segmentations of the garments that indicate which pixels in the images correspond to the garments and which pixels correspond to a background or a user's body parts in the images. Namely the segmentations provide the borders of the garments depicted in the images. These segmentation training images 309 are used by the AR unboxing system 224 to train the machine learning technique used to generate a segmentation of one or more garments depicted in a received RGB monocular image corresponding to a set of contents or virtual outfits that are made available by opening the virtual box. In some cases, the segmentation training images 309 include ground truth skeletal key points of one or more bodies depicted in the respective training monocular images to enhance segmentation performance on various distinguishing attributes (e.g., shoulder straps, collar or sleeves) of the garments. In some cases, the segmentation training images 309 include a plurality of image resolutions of bodies depicted in the images. The segmentation training images 309 can include labeled and unlabeled image and video data. The segmentation training images 309 can include a depiction of a whole body of a particular user, an image that lacks a depiction of any user (e.g., a negative image), a depiction of a plurality of users wearing different garments, and depictions of users wearing garments at different distances from an image capture device, such as for a virtual try-on AR experience.

Data Communications Architecture

Figure 4:
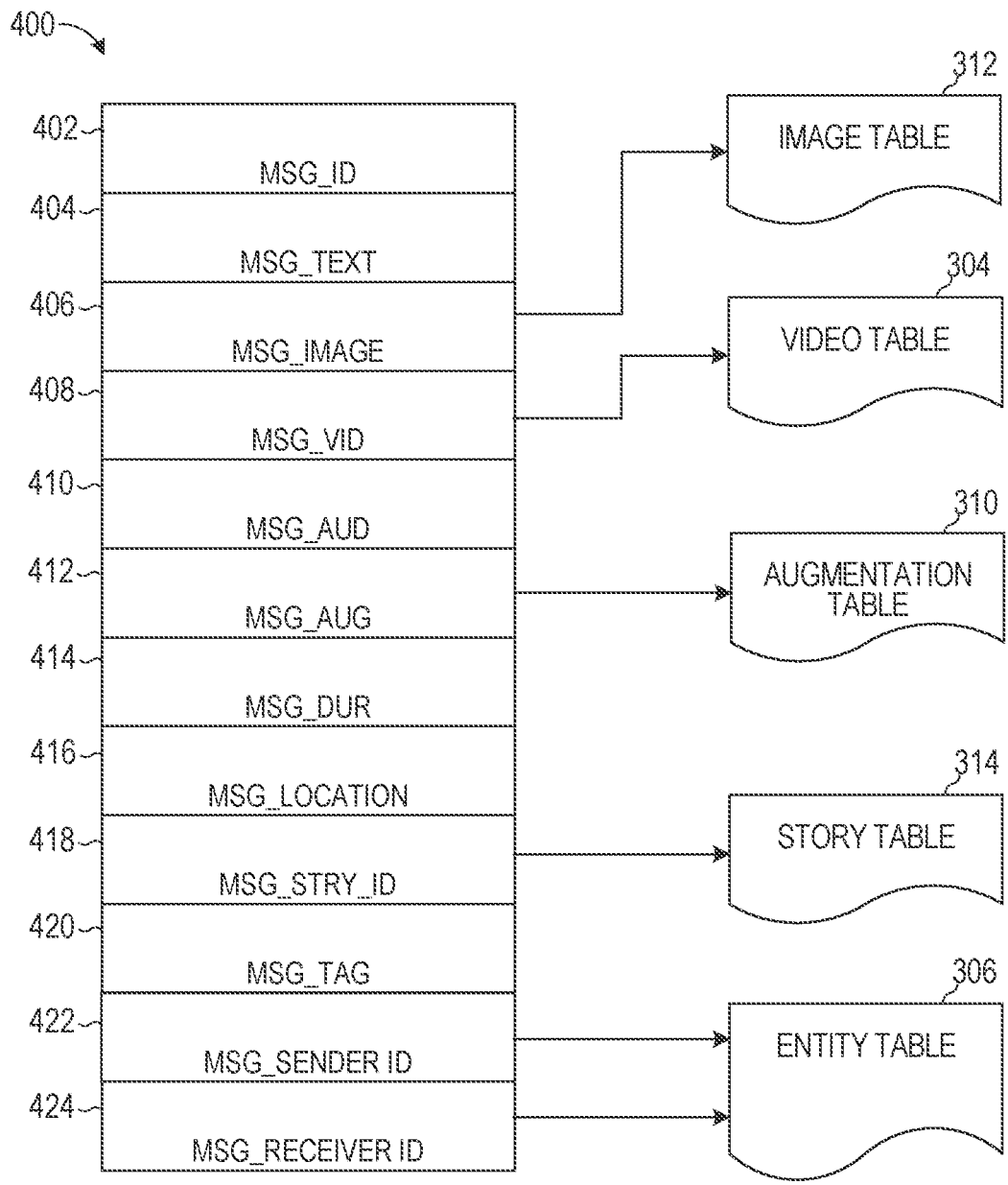
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

AR Unboxing System

Figure 5:
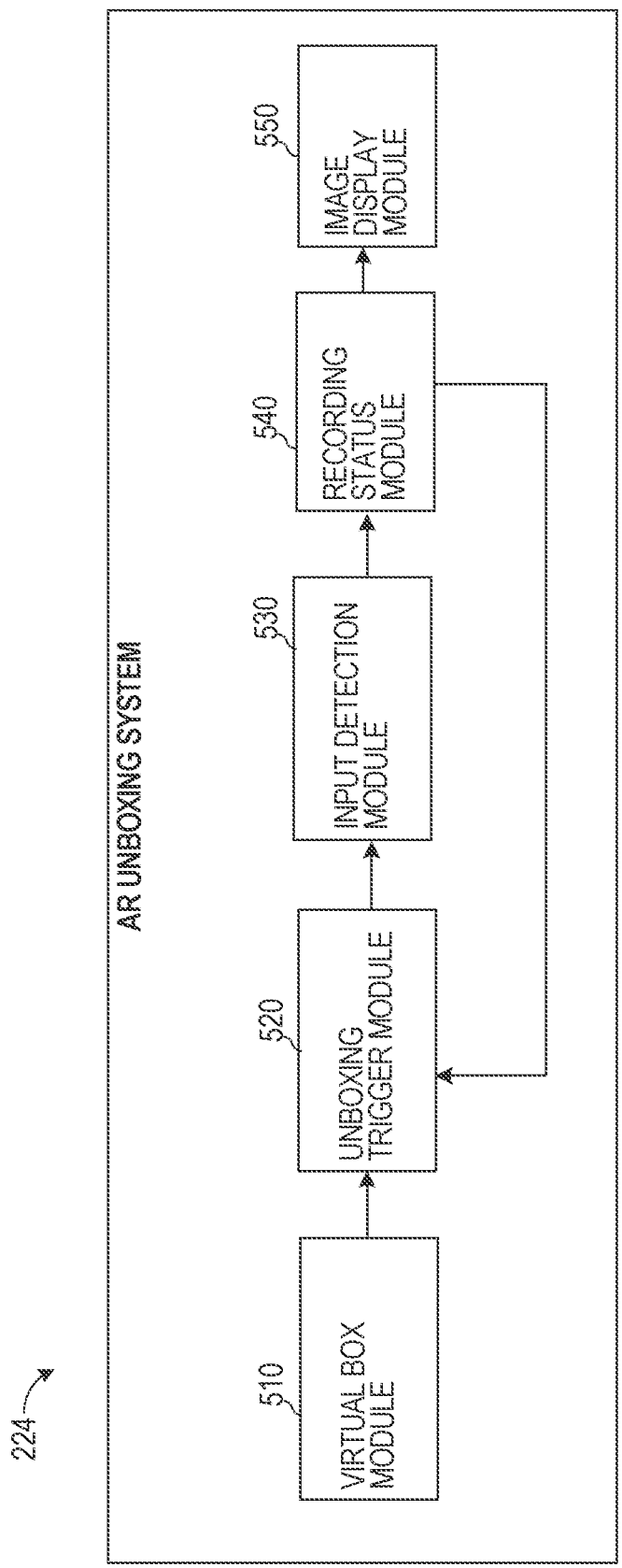
FIG. 5 is a block diagram showing an example AR unboxing system, according to example examples.

FIG. 5 is a block diagram showing an example AR unboxing system 224, according to example examples. AR unboxing system 224 includes a virtual box module 510, an unboxing trigger module 520, an input detection module 530, a recording status module 540, and an image display module 550. The virtual box module 510 is activated in response to receiving input from a user that selects an option to launch the AR unboxing experience. For example, a list of different AR experience can be presented to the user on a display that depicts a video stream captured by a front-facing or rear-facing camera. The AR unboxing system 224 can detect input that navigates through the list such as by swiping left or right. Each AR experience in the list is represented by a different corresponding AR experience icon. In response to detecting selection of the AR experience icon corresponding to the AR unboxing experience, the AR unboxing system 224 activates the virtual box module 510.

The virtual box module 510 accesses a database of virtual boxes that are current available to users to open and access. The virtual box module 510 can obtain a user profile of the user of the AR unboxing system 224 and search the database to find a virtual box that matches preferences stored in the user profile. The virtual box module 510 also applies one or more factors (e.g., environmental factors, location, time of day, and so forth) to the database to filter the list of virtual boxes to select a particular virtual box.

The virtual box module 510 can receive a list of shared AR unboxing experiences from various users or merchants trying to sell different products. Each box creator (user or merchant) can define the triggers for opening the box and the contents of the box. The box creator can also define the look and feel of the different boxes through an AR platform. The box creator can also define target recipients for the box by specifying attributes associated with the box. The attributes can represent the box contents and/or the level of difficulty of the triggers. Once created, the box creator can upload the AR unboxing experience to the AR unboxing system 224 for inclusion in the list of shared AR unboxing experiences. In some cases, the virtual box module 510 can access a user profile to identify one or more shared AR unboxing experiences that are associated with box attributes that match the user profile. The virtual box module 510 can then select only those identified one or more shared AR unboxing experiences for presentation to a user to select to activate.

The virtual box module 510 obtains a representation of the particular virtual box and instructs the image display module 550 to display the representation of the particular virtual box in the closed or locked state on top or within the video stream captured by the camera of the client device 102. The representation can include a box that appears to float in the real-world environment or that is placed on top of a real-world object, such as a desk or table. The virtual box module 510 also receives a time limit associated with the particular virtual box. The time limit can include a countdown timer during which the particular virtual box can be opened. If the virtual box is not successfully opened (e.g., by performing actions corresponding to triggers associated with the virtual box) within the time limit, the virtual box remains closed or locked permanently and the set of contents contained in the virtual box are discarded.

The virtual box module 510 communicates a unique identifier of the particular virtual box (e.g., a unique number and/or type of virtual box) to the unboxing trigger module 520. The unboxing trigger module 520 is configured to obtain a sequence of triggers and associate the sequence of triggers with the particular virtual box. The sequence of triggers controls access to the virtual box. Namely, the sequence of triggers represents a set of actions that need to be performed in sequence or out of sequence in order to change the state of the virtual box from a closed state to an open state. In the open state, the contents of the virtual box are made available to the user to access or consume.

The unboxing trigger module 520 accesses a database that associates different box types, factors, and/or unique identifiers with sequences of triggers. FIG. 6 shows an illustrative database 600 that associates different box types, factors, and/or unique identifiers with sequences of triggers. Specifically, the database 600 includes a box type field 610 (which can also include factors and/or unique identifiers) and a triggers field 620. The box type field 610 specifies different types of boxes and factors, such as environmental factors. In some cases, the unboxing trigger module 520 can retrieve a first set of triggers stored in the triggers field 620 associated with a given box type stored in the box type field 610. The unboxing trigger module 520 can also retrieve a second set of triggers stored in the triggers field 620 that correspond to one or more factors that match environmental factors stored in the box type field 610. The unboxing trigger module 520 can combine linearly the first and second sets of triggers to associate with the virtual box obtained by the virtual box module 510.

As an example, the unboxing trigger module 520 can determine that the box type received from the virtual box module 510 matches the box type 1 stored in the box type field 610 of a first entry 630 in the database 600. In response, the unboxing trigger module 520 retrieves a first sequence of triggers stored in the triggers field 620 of the first entry 630. The first sequence of triggers can include a sequence of user actions, such as shake, tear, speak and twist that need to be performed in a particular order. A shake action corresponds to input that shakes a client device 102, such as moving the client device 102 back and forth fast within a short specified time interval (e.g., 3 seconds). A tear action corresponds to input that touches or holds two or more portions of a virtual box and moves the portions in opposite directions. A speak action corresponds to voice input that speaks a specified command or response to a challenge question. A twist action corresponds to input that touches or holds a portion of the virtual box and rotates the portion about its axis.

As another example, the unboxing trigger module 520 can determine that a factor (e.g., one or more external factors such as a location of the client device 102, a time of day, a request to record a video of the user interacting with the virtual box being received, weather at the location of the client device 102, or experience level or activeness metric associated with a user, and so forth) received from the virtual box module 510 matches the environmental factor 1 stored in the box type field 610 of a second entry 640 in the database 600. In response, the unboxing trigger module 520 retrieves a second sequence of triggers stored in the triggers field 620 of the second entry 640. The second sequence of triggers can include a sequence of user actions, such as walking along a particular path or responding to a challenge question. The unboxing trigger module 520 can combine the first sequence of triggers with the second sequence of triggers. In one implementation, the unboxing trigger module 520 appends the second sequence of triggers to the first sequence of triggers such that actions in the first sequence triggers need to be completed before actions in the second sequence. In another implementation, the unboxing trigger module 520 inserts the second sequence of triggers ahead or within the first sequence of triggers.

In some implementations, the unboxing trigger module 520 communicates the obtained sequence of triggers to the input detection module 530 and to the virtual box module 510. In one example, the virtual box module 510 displays hints or representations of the obtained sequence of triggers.

In some examples, the hints or representations can be displayed when there is a threshold amount of time remaining on the time limit associated with the virtual box. For example, the virtual box module 510 can determine that the countdown timer has reached a specified value (e.g., 5 minutes remaining). In such cases, the virtual box module 510 can display some or all of the obtained sequence of triggers that have not yet been completed or a representation or hint corresponding to the obtained sequence of triggers.

The input detection module 530 monitors user actions performed on the client device 102 while the virtual box is being displayed in the closed state on top of or within a real-world environment depicted in a video stream. The input detection module 530 can access the obtained sequence of triggers. The input detection module 530 retrieves a first trigger that is in the sequence of triggers and monitors the user actions performed on the client device 102 to determine when a particular user action corresponds to the first trigger. For example, the first trigger can be a shake gesture. The input detection module 530 can monitor actions performed by the user interacting with the virtual box that is being displayed in the closed state. The input detection module 530 can detect that the client device 102 is being shaken and, in response, the input detection module 530 can determine that the first trigger has been satisfied. It should be understood that the words "triggers" and "conditions" are interchangeable and should be understood to have the same meaning. Once the first trigger or condition is satisfied, the input detection module 530 displays an indicator on the display informing the user of the progress in opening the virtual box. Specifically, initially a progress bar can be displayed with 0% completion status or 0/5 (if there are 5 triggers set) being shown. In response to determining that the first trigger has been completed, the progress bar can be updated to show 25% or more depending on the number of triggers that remain. This way, the user is informed as to how many more actions and how close the user is to opening the virtual box.

The triggers can include an appearance trigger. An appearance trigger can instruct the user to perform an action to change an appearance of the user. For example, the appearance trigger can instruct the user to find a fashion item (e.g., hat, sunglasses, article of clothing, jewelry, and so forth) and to wear the fashion item. The appearance trigger can provide a time limit for the user to change the appearance in the specified way. The appearance trigger can perform object recognition of a captured video feed to detect whether the change in appearance matches the specified instructions. For example, if the appearance trigger includes an instruction for the user to wear sunglasses, the appearance trigger can apply object recognition to detect presence of sunglasses in a predetermined proximity of the face of the user. In response to detecting the object associated with the instruction in the video feed within the specified time limit, the appearance trigger determines that the trigger has been satisfied.

The input detection module 530 access the sequence of triggers to obtain a next trigger that is in the sequence. The input detection module 530 also determines if the currently obtained trigger is a last trigger in the sequence of triggers. In response to determining that the currently obtained trigger is not the last trigger in the sequence, the input detection module 530 continues monitoring user actions to determine when the user actions correspond to the currently obtained trigger. In response to determining that the currently obtained trigger is the last trigger in the sequence, the input detection module 530 continues monitoring user actions to determine when the user actions correspond to the currently obtained trigger and also communicates with the recording status module 540 to activate a front-facing camera. Specifically, while the user is performing the last action needed to open the virtual box, the recording status module 540 is recording a video of the user's face. In some cases, the input detection module 530 instructs the recording status module 540 to only begin recording the user's face when the input detection module 530 determines that the user performed an action that corresponds to the last trigger in the sequence. In this case, the input detection module 530 instructs the recording statue module 540 to record or capture a video of the user's face concurrently with instructing the unboxing trigger module 520 to modify a state of the virtual box from the closed state to the open state. As part of modifying the state of the virtual box from the closed state to the open state, the unboxing trigger module 520 animates the virtual box as opening, such as by animating opening a door or entry into the virtual box that is displayed.

In some examples, the virtual box module 510 provides an interface that enables a first user to create a virtual box and define the sequence of triggers for opening the virtual box. The client device 102 of the first user can receive input from the first user that selects a set of content to include in the virtual box. The client device 102 of the first user can also request the first user to specify a sequence of triggers to associate with the virtual box. The client device 102 can present a list of available triggers and the first user can select any number and combination of triggers from the list. The client device 102 can also allow the first user to define a time limit to associate with the virtual box. The client device 102 of the first user can receive input from the first user to share the virtual box with a second user. In response, the virtual box module 510 receives input from the first user that specifies one or more recipients. The virtual box module 510 sends the virtual box to the specified recipients, such as to their respective messaging clients 104 implemented on their respective client device 102. The client devices 102 of the specified recipients receive the virtual box via the messaging client 104.

In an implementation, a client device of a second user (e.g., one of the specified recipients) can detect input that selects an option to launch the virtual box received from the first user. The virtual box module 510 can then communicate with the unboxing trigger module 520 and the input detection module 530 to display the virtual box and determine when the sequence of actions performed by the second user match or correspond to the sequence of triggers associated with the virtual box that were defined by the first user. In some cases, the recording status module 540 automatically captures an image or video of the second user when a last or final action has successfully been performed that matches the last or final trigger in the sequence defined by the first user. In this case, the recording status module 540 automatically responds to the first user via the messaging client 104 with a message that includes a video or image depicting a reaction of the second user to successfully opening the virtual box sent by the first user. The first user via the client device 102 can playback the video or view the image that depicts the reaction of the second user opening the virtual box that was created by the first user.

In some examples, the virtual box module 510 can receive input or a request to repackage the virtual box after the virtual box changes states from the closed state to the open state. In response, the virtual box module 510 can animate the virtual box as closing and display the virtual box in the closed state. The virtual box module 510 communicates an indication to the unboxing trigger module 520 that the same box has been repackaged. In response, the unboxing trigger module 520 can modify the sequence of triggers associated with the virtual box, such as to increase a complexity of the actions that need to be performed to open the virtual box. In such cases, the unboxing trigger module 520 accesses the database 600 to obtain a trigger from the trigger field 620 that corresponds to a repacking factor stored in the box type field 610. The unboxing trigger module 520 inserts the obtained trigger into a random location or a specified location (e.g., the start or end) of the sequence of triggers previously associated with the virtual box. In this way, the user can experience reopening the same virtual box with a different level of difficulty.

In some cases, the virtual box module 510 can determine that the user previously did not request to record a video depicting the user opening or interactive with the virtual box. In such cases, if the user requests to repackage the virtual box, the virtual box module 510 can communicate with the recording status module 540 to automatically activate a front-facing camera of the client device 102 to capture an image or video of the user interacting with the virtual box to reopen the virtual box. In some cases, the video or image is only captured after a first initial portion of the sequence of triggers is performed and when there are less than a specified number or quantity of triggers remaining in the sequence of triggers to be performed.

Figure 7:
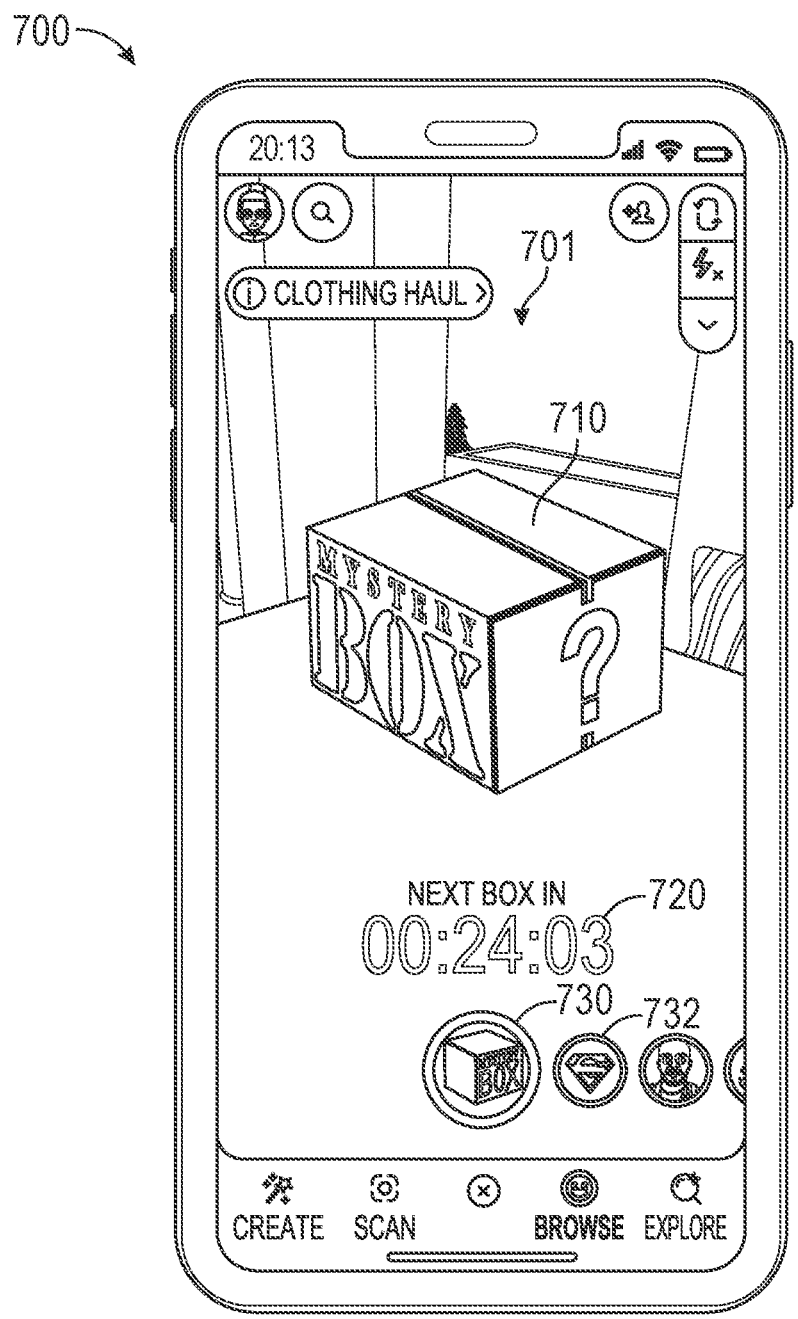
FIGS. 7, and 8 are diagrammatic representations of outputs of the AR unboxing system, in accordance with some examples.
Figure 8:
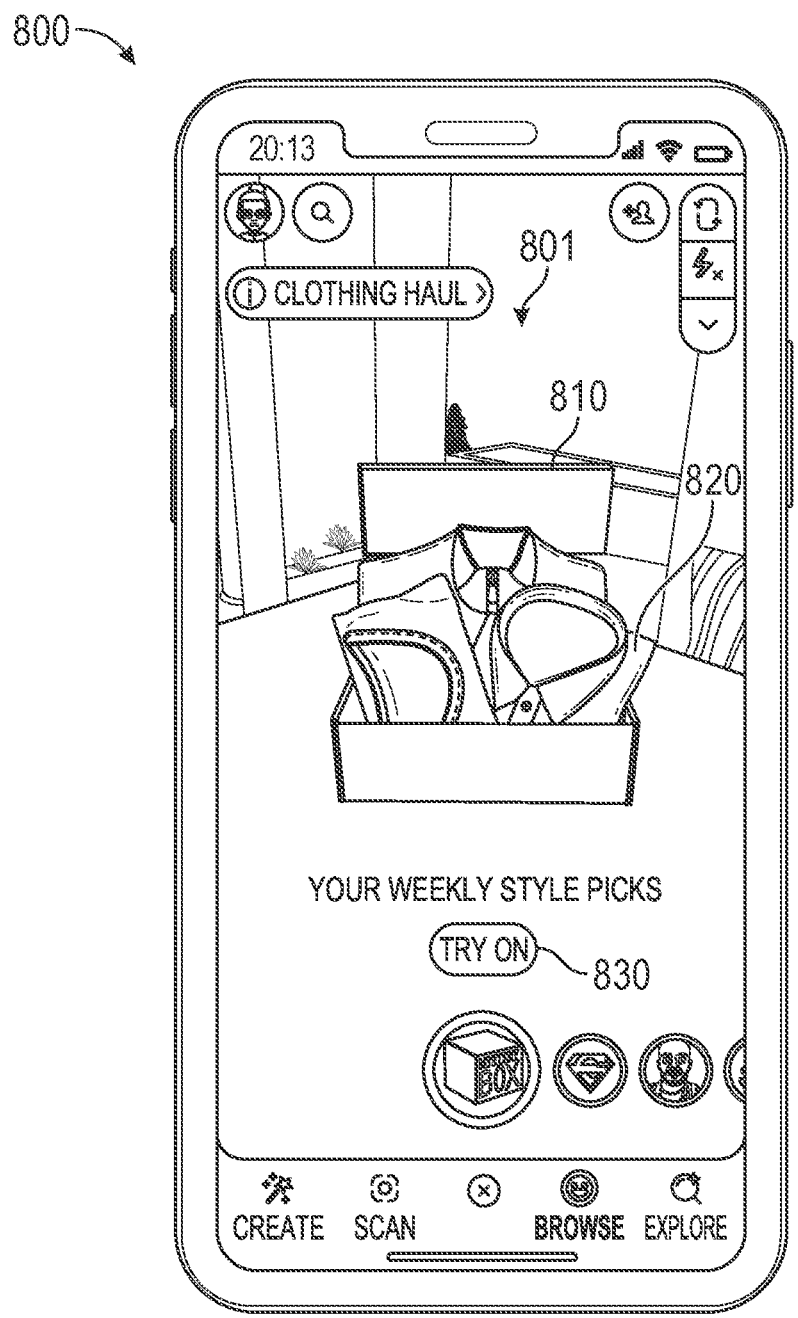

FIGS. 7 and 8 show illustrative outputs of the AR unboxing system 224. For example, as shown in FIG. 7, a user interface 700 is displayed on a screen of a client device 102. The user interface 700 includes a real-world environment depicted in a video feed 701. The user interface 700 includes a list of AR experiences, such as a virtual unboxing AR experience 730 and another AR experience 732. The client device 102 can receive input that navigates between the list of AR experiences to select the virtual unboxing AR experience 730. In response, the AR unboxing system 224 obtains an augmented reality element, such as a virtual box, corresponding to the virtual unboxing AR experience 730. The AR unboxing system 224 displays a representation of the virtual box 710 in the video feed 701 depicted in the user interface 700 in the closed state. The AR unboxing system 224 can also determine that the virtual box is associated with a time limit. In such cases, the AR unboxing system 224 displays the countdown timer 720 indicating how much time is left for the user to perform the sequence of actions that match the triggers for opening the virtual box 710. In some cases, although not shown, the AR unboxing system 224 can also present a progress bar indicating or representing how many of the triggers have currently been successfully performed and how many triggers remain.

The AR unboxing system 224 can monitor actions performed by the user. The AR unboxing system 224 can determine that the sequence of actions performed by the user correspond to the sequence of triggers associated with the virtual box 710. The AR unboxing system 224 can, in response, modify a state of the virtual box 710 from being in a closed state to being in an open state. For example, as shown in FIG. 8, the virtual box 810 is depicted as being in an open state and a representation of the set of contents 820 available now for the user to consume or access is provided or displayed. The virtual box 810 and the set of contents 820 are presented within the real-world environment depicted in the video feed 801 captured by a front-facing or rear-facing camera of the client device 102.

In some examples, the set of contents include virtual articles of clothing or garments. The AR unboxing system 224 can receive input that selects a particular one of the virtual articles of clothing. In response, the AR unboxing system 224 can present a try on option 830 and can receive input that selects the try on option 830. In this case, the AR unboxing system 224 launches or activates a virtual try-on AR experience in which a front-facing or rear-facing camera is used to capture a depiction of the user and is augmented with the selected virtual articles of clothing. Namely, the AR unboxing system 224 can present or overlay the virtual articles of clothing on top of a depiction of the user so the user can visualize how the user looks wearing the virtual articles of clothing. The AR unboxing system 224 can present an option to purchase the real-world clothing corresponding to the virtual articles of clothing being tried on. In response to receiving input selecting the option to purchase, the AR unboxing system 224 completes an e-commerce transaction to purchase the real-world clothing from an online merchant to have the real-world clothing delivered physically to the user. In some cases, the real-world clothing can be purchased at a discount in response to the user successfully performing the sequence of actions that correspond to the triggers associated with opening the virtual box 810.

Figure 9:
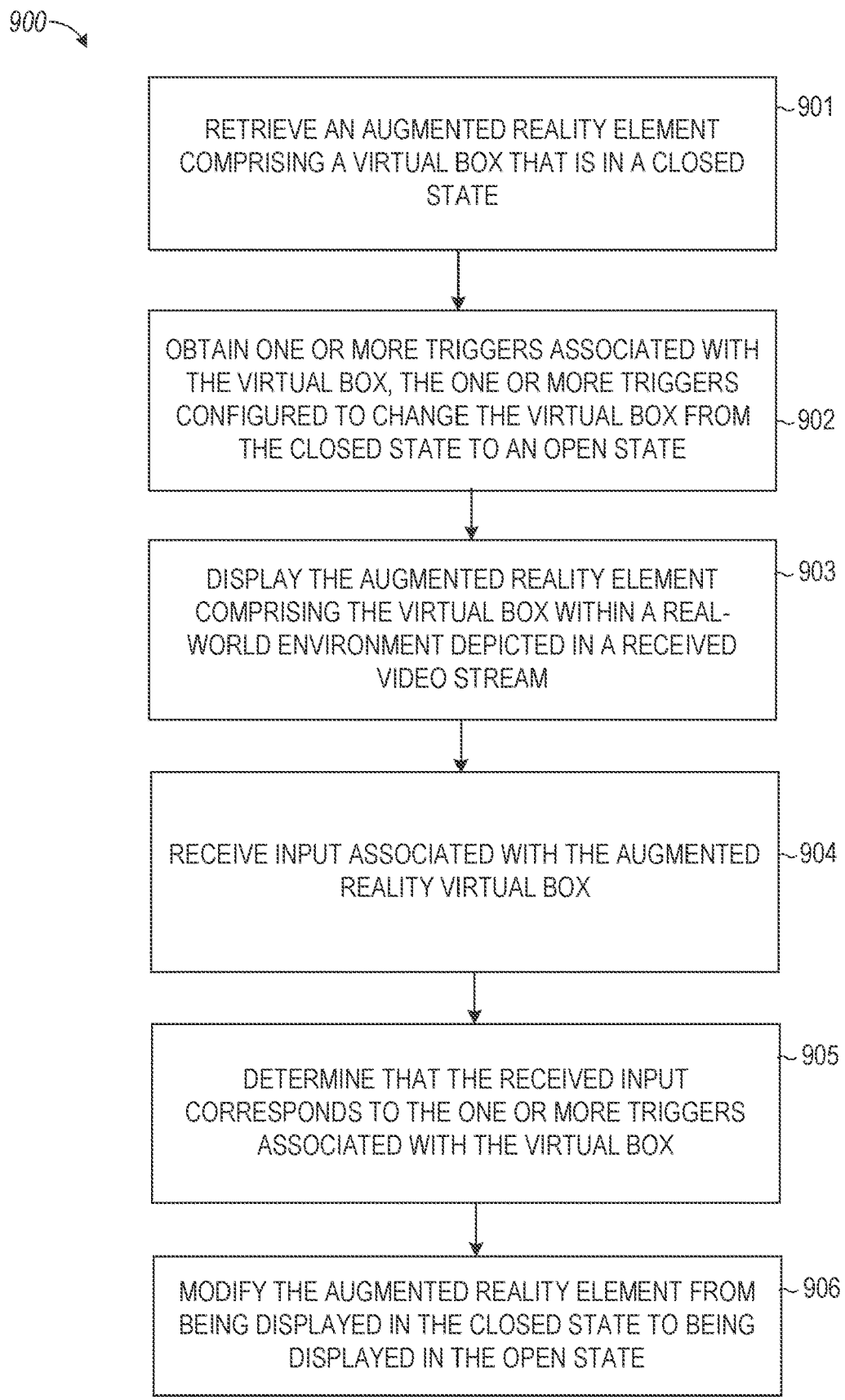
FIG. 9 is a flowchart illustrating example operations of the AR unboxing system, according to some examples.

FIG. 9 is a flowchart of a process 900 performed by the AR unboxing system 224, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the AR unboxing system 224 (e.g., a client device 102 or a server) retrieves an augmented reality element comprising a virtual box that is in a closed state, as discussed above. For example, the AR unboxing system 224 receives a virtual box from another client device 102 and/or receives input selecting an option to launch a virtual unboxing AR experience. In response, the AR unboxing system 224 obtains the augmented reality element that includes a virtual box 710 and displays the virtual box 710 in the user interface 700 (FIG. 7).

At operation 902, the AR unboxing system 224 obtains a sequence of triggers associated with the virtual box, the sequence of triggers configured to change the virtual box from the closed state to an open state, as discussed above. For example, the AR unboxing system 224 accesses a database that associates different box types with sequences of triggers to obtain the sequence of triggers associated with the virtual box 710.

At operation 903, the AR unboxing system 224 displays the augmented reality element comprising the virtual box within a real-world environment depicted in a video stream, as discussed above. For example, the AR unboxing system 224 displays the virtual box 710 in the user interface 700 on top of the video feed 701 (FIG. 7).

At operation 904, the AR unboxing system 224 receives input associated with the augmented reality virtual box, as discussed above. For example, the AR unboxing system 224 monitors user interactions or user actions with the box, such as shaking, twisting, tearing, speaking, and so forth.

At operation 905, the AR unboxing system 224 determines that the received input corresponds to the sequence of triggers associated with the virtual box, as discussed above. For example, the AR unboxing system 224 determines that the sequence of user actions matches or corresponds to the sequence of triggers obtained and associated with the virtual box 710.

At operation 906, the AR unboxing system 224 modifies the augmented reality element from being displayed in the closed state to being displayed in the open state in response to determining that the received input corresponds to the sequence of triggers associated with the virtual box, as discussed above. For example, the AR unboxing system 224 modifies the virtual box 710 from being in the closed state to depict the virtual box 810 (FIG. 8) being in an open state to reveal the set of contents 820 contained in the virtual box 810.

Machine Architecture

Figure 10:
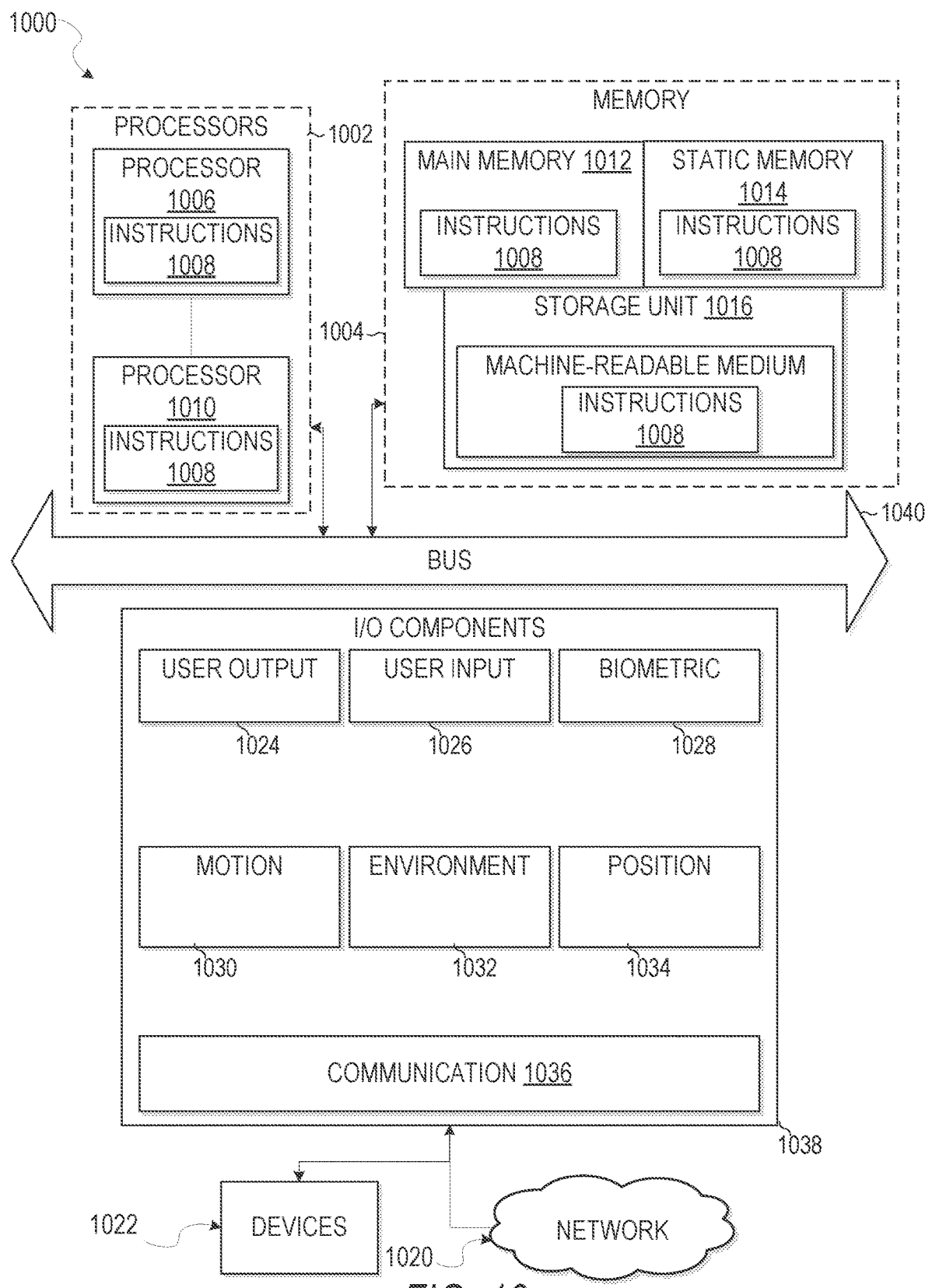
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
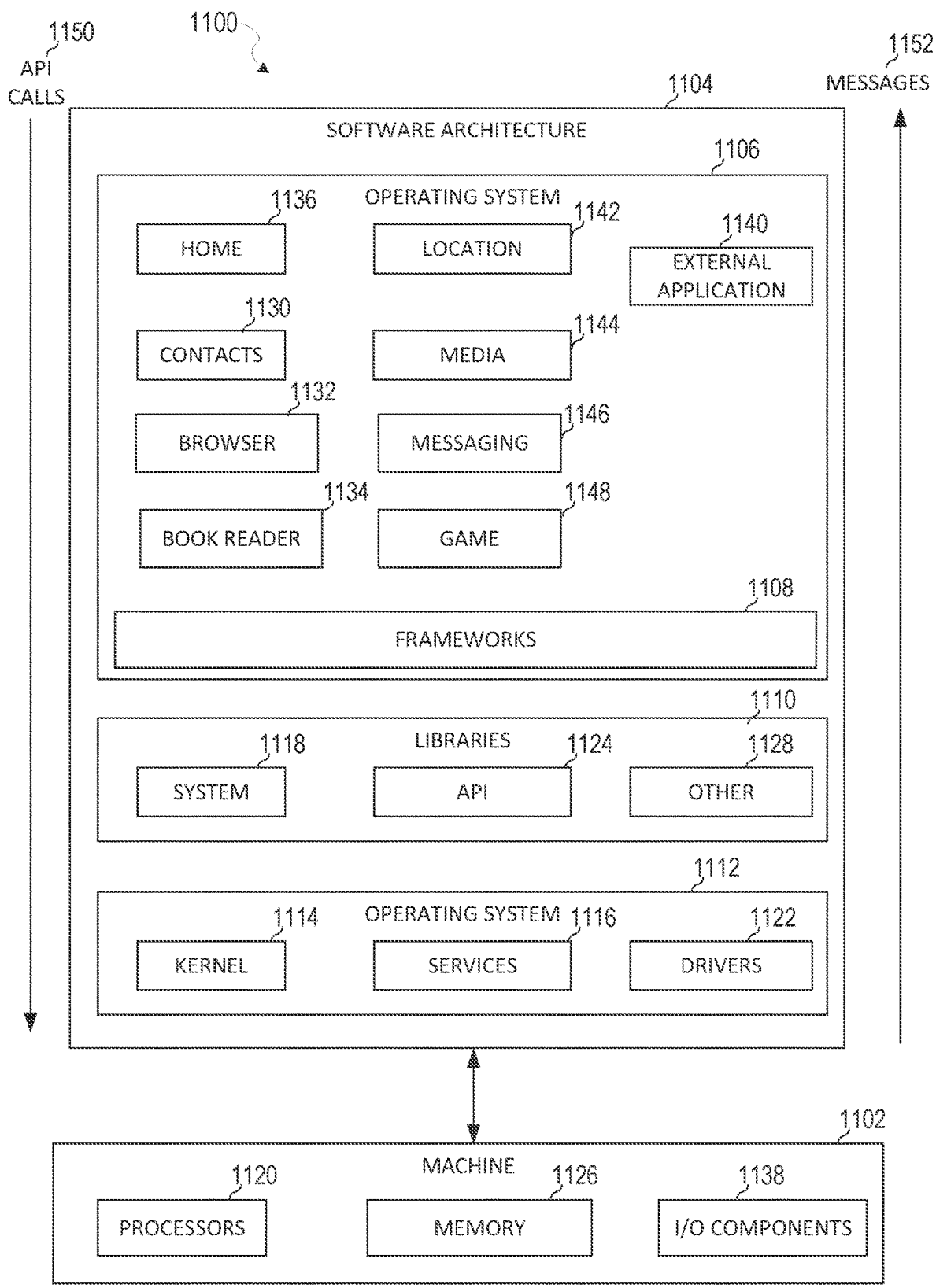
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm).

In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   determining one or more external factors associated with a real-world environment, the one or more external factors comprising weather at the location, of the device or activeness metric associated with a user;
   obtaining, by at least one processor of a device based on the one or more external factors, a sequence of triggers associated with a virtual box, the sequence of triggers configured to change the virtual box from a closed state to an open state;
   determining, by the at least one processor of the device, that a first portion of a sequence of user actions corresponding to the sequence of triggers have been performed by the user; and
   in response to determining that the first portion of the sequence of user actions have been performed by the user, initiating, by the at least one processor of the device and using a memory component coupled to the at least one processor, recording of a video in which the user interacts with the virtual box to capture a reaction of the user interacting with the virtual box.

2. The method of claim 1, further comprising:
   retrieving an augmented reality element comprising the virtual box that is in the closed state; and
   displaying the augmented reality element comprising the virtual box within a real-world environment depicted in an image.

3. The method of claim 1, further comprising:
   receiving input associated with the virtual box;
   determining that the received input corresponds to the sequence of triggers associated with the virtual box; and
   modifying the virtual box from being displayed in the closed state to being displayed in the open state in response to determining that the received input corresponds to the sequence of triggers associated with the virtual box.

4. The method of claim 1, further comprising:
   enabling access to one or more objects contained inside the virtual box in response to determining that the sequence of triggers associated with the virtual box have been completed.

5. The method of claim 4, further comprising generating, for display, a representation of the one or more objects within a real-world environment after modifying the virtual box from being displayed in the closed state to being displayed in the open state.

6. The method of claim 1, further comprising:
   determining a type associated with the virtual box; and
   searching, based on the determined type, a database that associates different types of virtual boxes with different sequences of triggers, wherein the sequence of triggers is obtained in response to searching the database.

7. The method of claim 6, wherein a first sequence of the different sequences of triggers comprises a first sequence of user actions, and wherein a second sequence of the different sequences of triggers comprises a second sequence of user actions, a complexity of the second sequence of user actions being greater a complexity of the first sequence of user actions.

8. The method of claim 1, further comprising:
   activating a rear-facing camera to record the video.

9. The method of claim 8, further comprising:
   receiving a request to record the video in which the user interacts with the virtual box to change the virtual box from the closed state to the open state; and
   in response to receiving the request, adding a new trigger to the sequence of triggers, wherein the virtual box changes from being displayed in the closed state to being displayed in the open state in response to determining completion of the new trigger and the sequence of triggers.

10. The method of claim 9, further comprising:
repacking the virtual box to change the virtual box from the open state to the closed state;
in response to repacking the virtual box, adding a new trigger to the sequence of triggers, wherein the virtual box changes from being displayed in the closed state to being displayed in the open state in response to determining completion of the new trigger; and
recording the video in which the user interacts with the virtual box to change the virtual box from the closed state to the open state.

11. The method of claim 1, wherein the sequence of triggers comprises a sequence of user actions, further comprising:
in response to determining that the first portion of the sequence of user actions have been performed by the user, activating a front-facing camera to capture the reaction of the user.

12. The method of claim 11, further comprising:
determining that a final user action in the sequence of user actions has been performed; and
capturing an image or video of the reaction of the user concurrently with modifying the virtual box from being displayed in the closed state to being displayed in the open state.

13. The method of claim 1, further comprising:
receiving an augmented reality element comprising the virtual box from a second device of a second user; and
automatically sending the recorded video of the reaction of the user to the second device of the second user.

14. A system comprising:
at least one processor of a device; and
a memory component having instructions stored thereon that, when executed by the at least one processor, cause the at least one processor to perform operations comprising:
determining one or more external factors associated with a real-world environment, the one or more external factors comprising weather at the location, of the device or activeness metric associated with a user;
obtaining, based on the one or more external factors, a sequence of triggers associated with a virtual box, the sequence of triggers configured to change the virtual box from a closed state to an open state;
determining that a first portion of a sequence of user actions corresponding to the sequence of triggers have been performed by the user; and
in response to determining that the first portion of the sequence of user actions have been performed by the user, initiating recording of a video in which the user interacts with the virtual box to capture a reaction of the user interacting with the virtual box.

15. The system of claim 14, the operations further comprising:
retrieving an augmented reality element comprising the virtual box that is in the closed state; and
displaying the augmented reality element comprising the virtual box within a real-world environment depicted in an image.

16. The system of claim 14, the operations further comprising
receiving input associated with the virtual box;
determining that the received input corresponds to the sequence of triggers associated with the virtual box; and
modifying the virtual box from being displayed in the closed state to being displayed in the open state in response to determining that the received input corresponds to the sequence of triggers associated with the virtual box.

17. A non-transitory computer-readable storage medium having stored thereon instructions that, when executed by at least one processor of a device, cause the at least one processor to perform operations comprising:
determining one or more external factors associated with a real-world environment, the one or more external factors comprising weather at the location, of the device or activeness metric associated with a user;
obtaining, based on the one or more external factors, a sequence of triggers associated with a virtual box, the sequence of triggers configured to change the virtual box from a closed state to an open state;
determining that a first portion of a sequence of user actions corresponding to the sequence of triggers have been performed by the user; and
in response to determining that the first portion of the sequence of user actions have been performed by the user, initiating, by the at least one processor of the device and using a memory component coupled to the at least one processor, recording of a video in which the user interacts with the virtual box to capture a reaction of the user interacting with the virtual box.

18. The non-transitory computer-readable storage medium of claim 17, the operations further comprising:
retrieving an augmented reality element comprising the virtual box that is in the closed state; and
displaying the augmented reality element comprising the virtual box within a real-world environment depicted in an image.

19. The non-transitory computer-readable storage medium of claim 17, the operations comprising:
determining a type associated with the virtual box; and
searching, based on the determined type, a database that associates different types of virtual boxes with different sequences of triggers, wherein the sequence of triggers is obtained in response to searching the database.

20. The non-transitory computer-readable storage medium of claim 17, the operations comprising:
activating a rear-facing camera of a device to record the video.

* * * * *

UNITED STATES PATENT AND TRADEMARK OFFICE
CERTIFICATE OF CORRECTION

| | |
|---|---|
| PATENT NO. | : 12,170,747 B2 |
| APPLICATION NO. | : 18/223721 |
| DATED | : December 17, 2024 |
| INVENTOR(S) | : Dudovitch et al. |

Page 1 of 1

It is certified that error appears in the above-identified patent and that said Letters Patent is hereby corrected as shown below:

In the Claims

In Column 36, Lines 4-5, in Claim 16, after "comprising", insert --:--

Signed and Sealed this
Fourth Day of November, 2025

John A. Squires
*Director of the United States Patent and Trademark Office*